United States Patent [19]

Hutchins et al.

[11] Patent Number: 4,729,788

[45] Date of Patent: Mar. 8, 1988

[54] THERMOPHILIC MICROBIAL TREATMENT OF PRECIOUS METAL ORES

[75] Inventors: Stephen R. Hutchins; Michael S. Davidson, both of Golden; James A. Brierley; Corale L. Brierley, both of Wheat Ridge, all of Colo.

[73] Assignee: Advanced Mineral Technologies, Inc., Golden, Colo.

[21] Appl. No.: 6,487

[22] Filed: Jan. 23, 1987

[51] Int. Cl.⁴ ............................................. C22B 11/04
[52] U.S. Cl. ......................................... 75/118 R; 75/2; 75/97 A; 75/101 R; 75/105; 75/108; 423/22; 423/27; 423/29; 423/DIG. 17
[58] Field of Search .............. 75/101 R, 97 A, 118 R, 75/105, 108, 2; 423/27, 22, DIG. 17, 29

[56] References Cited

U.S. PATENT DOCUMENTS 4,497,778  2/1985  Pooley ..................................... 423/27
4,571,387  2/1986  Bruynesteyn et al. ............. 75/101 R

FOREIGN PATENT DOCUMENTS 0035005  4/1975  Japan ......................... 423/DIG. 17

OTHER PUBLICATIONS

Tuovinen, O. H. and Kelly, D. P., "Use of Micro-Organisms for the Recovery of Metals", International Metallurgical Reviews, Review 179, vol. 19, 1974, pp. 21–29.

Primary Examiner—Robert L. Stoll
Attorney, Agent, or Firm—Hopgood, Calimafde, Kalil, Blaustein & Judlowe

[57] ABSTRACT

A method is provided for the recovery of precious metals, such as gold and silver, from refractory sulfidic material and refractory carbonaceous sulfidic material. The sulfidic material is pulped and bioleached using either facultative or obligate thermophiles at temperatures in excess of about 45° C. and ranging up to about 90° C. The residue remaining from the bioleach is neutralized and washed and the precious metals therein recovered by dissolution.

19 Claims, 8 Drawing Figures

THERMOPHILIC MICROBIAL TREATMENT OF PRECIOUS METAL ORES

This invention relates to the recovery of precious metals from refractory sulfide materials, e.g., mineral sulfides, carbonaceous sulfide ores, concentrates, tailings, among other sulfide materials.

STATE OF THE ART

It is known to subject sulfide materials, e.g., mineral sulfides, tailings, and the like, to pre-oxidation in order to enhance the subsequent recovery of gold and silver therefrom by cyanide leaching, particularly refractory sulfide and carbonaceous sulfide materials.

Such sulfide materials frequently contain iron in the ferrous state with or without other metals in the form of complex compounds. The precious metals are usually occluded within the sulfide mineral. For example, gold occurs as finely disseminated sub-microscopic particles in a refractory sulfide host, such as pyrite or arsenopyrite, and not as a solid solution as is often mistakenly thought. Because of this finely disseminated nature, this type of gold cannot be liberated easily by fine grinding and then directly and efficiently recovered by cyanidation. Attempts to recover gold by this method generally result in recoveries in the neighborhood of about 20% to 60% and in high cyanide consumption which renders the process uneconomical.

One method for freeing up the precious metals has been to subject the sulfide material to oxidation roasting to remove sulfur as $SO_2$ and provide an oxide residue which is thereafter leached with a cyanide solution to dissolve the liberated gold and silver. The gold and silver are thereafter subsequently recovered from solution using known processes. However, oxidation roasting of sulfide ores or concentrates present environmental pollution problems and also tend to be cost intensive. Even then it may be difficult to remove the precious metals by cyanidation.

Another method is disclosed in a recently issued U.S. patent (U.S. Pat. No. 4,610,724 dated Sept. 9, 1986) in which a process is disclosed for recovering gold from refractory auriferous iron containing sulfidic material. An aqueous slurry of the material is pressure oxidation leached in an autoclave at 135° C. to 250° C. under a total pressure of 500 to 5000 kPa to oxidize the sulfide sulfur to the sulfate form and thus release the gold from the refractory state and render it leachable by cyanidation. The gold is thereafter separately recovered from the leach solution. The heat and pressure requirements of the system likewise makes this process cost intensive.

Another known process is to pre-oxidize refractory sulfide concentrates by bioleaching. One such process is disclosed in a paper by R. W. Lawrence and A. Bruynesteyn entitled Biological Pre-oxidation To Enhance Gold and Silver Recovery from Refractory Pyritic Ores and Concentrates (CIM Bulletin, September 1983, pp. 107-110). The paper states that the oxidation of sulfide minerals by biological methods through the action of the bacterium *T. ferrooxidans* is well known.

A particular pyritic sulfide concentrate, among others, containing 13.6 grams/ton of gold, 99 grams/ton of silver, 28.5% Fe, 30.1% S, 0.4% As, 0.02% Sb, 8.3% Zn and 16% insolubles and having a particle size 80% passing through 325 mesh (Tyler) was batch-leached at a pulp density of 20% solids in 2L or 20L turbine agitated, baffled tanks at 35° C. with $CO_2$ enriched (1%) air sparging. The pulp was adjusted to a pH of 2.0 with sulfuric acid before it was inoculated with an active culture of *T. ferrooxidans*, previously grown on respective concentrates, and originally isolated from the Britannia Mine near Vancouver, Canada (*J. Bacteriol.*, 85, 1963, pp. 595-603). The leach solution also contained iron-free nutrient salts for the bacteria. Results obtained on a 20L bioleach test on the aforementioned concentrate showed that the oxidation of the pyrite was rapid at 0.38%/h. At approximately 60% oxidation, the leach rates declined, probably due to the low pH which had reached a value of 0.5 and probably due to the 35 g/L ferric iron concentration in the leach solution. Although bacteria can be adapted to low pH values, unadapted bacteria are most viable in the range of 1.8-2.4. The amount of oxidation subsequently reached 84%.

The residue remaining from the bioleach with the liberated gold was subjected to cyanide leaching to recover the gold. With 84% oxidation of the concentrate, the gold recovery was enhanced to 81%; whereas, direct cyanidation of the concentrate without bioleaching gave only 24.0% gold recovery.

A disadvantage of this process is that oxidation of the concentrate results in an exothermic reaction and the temperature tends to increase during the bioleaching operation. Since such temperatures can exceed the temperature at which the bacteria survive, the bacteria lose their efficacy. To avoid this, an elaborate cooling system is generally necessary which adds to the cost of the process.

In Canadian Pat. No. 1,122,414 which issued on Apr. 27, 1982, a bioleaching process is disclosed for leaching minerals in order to extract metal values in a soluble state. According to the patent, it is known that sulfide ores usually contain ferrous iron in combination with other metals forming more complex sulfides and that certain varieties of bacteria, chiefly those known as Thiobacilli (including Ferrobacilli) and, more specifically, *Thiobacillus ferrooxidans* and *Thiobacillus thiooxidans*, have the ability to oxidize the sulfide and ferrous ions to sulfate and ferric ions, which in aqueous solution are known to have the ability of leaching other minerals, such as the ores of uranium (and other actinides), cadmium, cobalt, tin, titanium, copper, nickel, zinc and molybdenum.

According to the patent, it is preferred to operate the process using *Thiobacillus ferrooxidans* which is characterized by the ability to oxidize iron in acidic solution. Thus, the patentee prefers to use selected acid-resistant strains which can operate down to pH 1.0, for example the Beck strain (ATCC 13,598:NCIB 8,451), the Lundgren strain (ATCC 13,661); the Sutton strain (ATCC 13,728); the Trussel strain (ATCC 19,859; NCIB 9,490; and also a strain deposited in the American Type Culture Collection, Washington, D.C. under the number 12,241. Certain other strains are also discussed.

While the patent states that these bacteria are more efficient in leaching operations at elevated temperatures, a temperature range of 20° C. to 70° C. being given, nowhere in the Canadian patent is an actual example given in which elevated temperatures are employed. For example, *Thiobacillus ferrooxidans* is mentioned which is capable of growth on mineral sulfides, such as pyrites. The cultures were incubated at 30° C. However, no examples of higher temperatures are given. Two experiments were conducted (Experiments 1 and 2) and neither mentions any temperature whatever. Thus, there is no certainty that the bacteria mentioned would survive at temperatures of 45° C. and above. Moreover, the examples are limited to the bacterial leaching of uranium ore, no mention being made to the selective recovery of precious metals from refractory sulfide ores.

It would be desirable to provide a bioleaching process for recovering precious metals, e.g., gold and silver, from refractory sulfide and refractory carbonaceous sulfide material using bacteria which are viable at elevated temperatures, i.e., temperatures of 45° C. and above, for example, temperatures ranging from over about 45° C. to about 90° C.

OBJECTS OF THE INVENTION

It is an object of the invention to provide a bioleaching process for the recovery of precious metals from refractory sulfide and refractory sulfide carbonaceous material.

Another object is to provide a bioleaching process for the recovery of precious metals from sulfidic materials using thermophilic bacteria capable of effecting bioleaching at elevated temperatures of about 45° C. and above.

These and other objects will more clearly appear when taken in conjunction with the following disclosure, the appended claims and the accompanying drawings.

STATEMENT OF THE INVENTION

The invention is directed to a method for recovering precious metals from particulate refractory mineral sulfides in which at least one precious metal is occluded in a form that inhibits the recovery thereof by conventional leaching processes. The method comprises bioleaching a mineral sulfide containing said occluded precious metal with an aqueous solution containing at least one thermophilic bacterium capable of promoting the oxidation of said mineral sulfide at an elevated temperature of at least about 45° C., but not exceeding that temperature above which the bacterium is not viable or is degraded. The bioleaching is carried out in the presence of nutrients to promote the growth of said thermophile for a time at least sufficient to oxidize the sulfide material and substantially liberate the precious metal and provide a residue containing said liberated precious metal. Generally speaking, the bioleach solution is acid and has a pH ranging from about 0.5 to 3, preferably about 0.5 to 2.5. The precious-metal-containing residue is then separated from the bioleach solution and the precious-metal-containing residue thereafter leached with an aqueous leach solution selective to the dissolution of the liberated precious metal to thereby provide a residue impoverished in the precious metal.

The thermophilic bacterium may preferably be acidophilic for use in acidic bioleach solutions. Sulfolobus species is one illustration of an acidophilic bacterium. This bacterium is particularly temperature resistant at temperatures ranging from over about 45° C. to about 90° C., the upper temperature selected not exceeding that temperature above which the thermophile is degraded or loses its viability.

The Sulfolobus species, which are obligate thermophiles, include *Sulfolobus brierlevi*, *Sulfolobus acidocaldarius*, *Sulfolobus solfataricus*, and Sulfolobus BC among others. These bacteria are generally found in hot springs. Examples of the locale where such bacteria are found include the hot springs in Yellowstone Park and hot springs located in Iceland.

Figure 7:
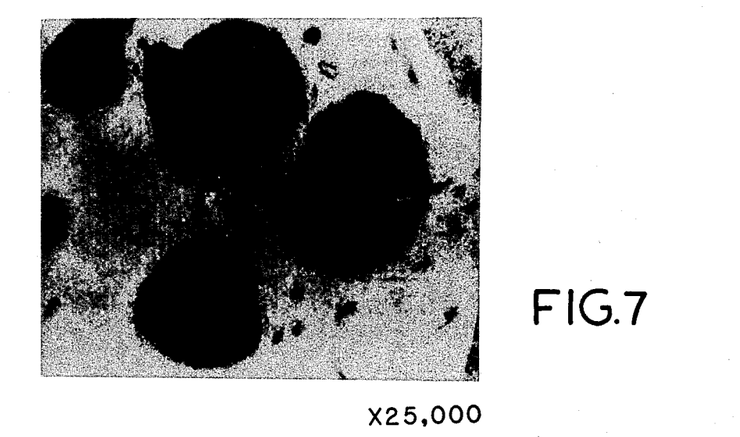
FIG. 7 is a photomicrograph of *Sulfolobus brierlevi* taken at 25,000 times magnification.
Figure 8:
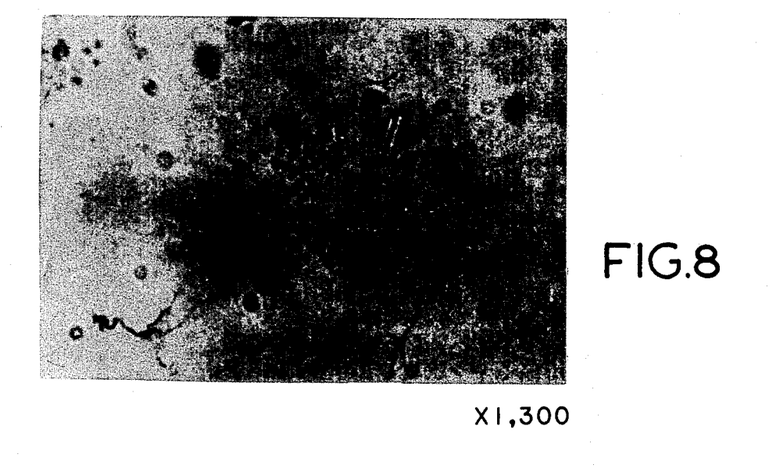
FIG. 8 is a photomicrograph of *Sulfolobus brierlevi* taken at 1300 times magnification.

FIGS. 7 and 8 are photomicrographs of *Sulfolobus brierlevi* taken at 25,000 and 1300 times magnification, respectively.

The precious metal is preferably recovered from the leached residue by cyanidation which is a well known process. The sulfidic material need not be completely pre-oxidized to liberate the precious metal. For example, the sulfidic material may be only partially pre-oxidized and still provide for the recovery of gold and silver at recovery efficiencies ranging up to about 80% and higher.

DETAILS OF THE INVENTION

Figure 1:
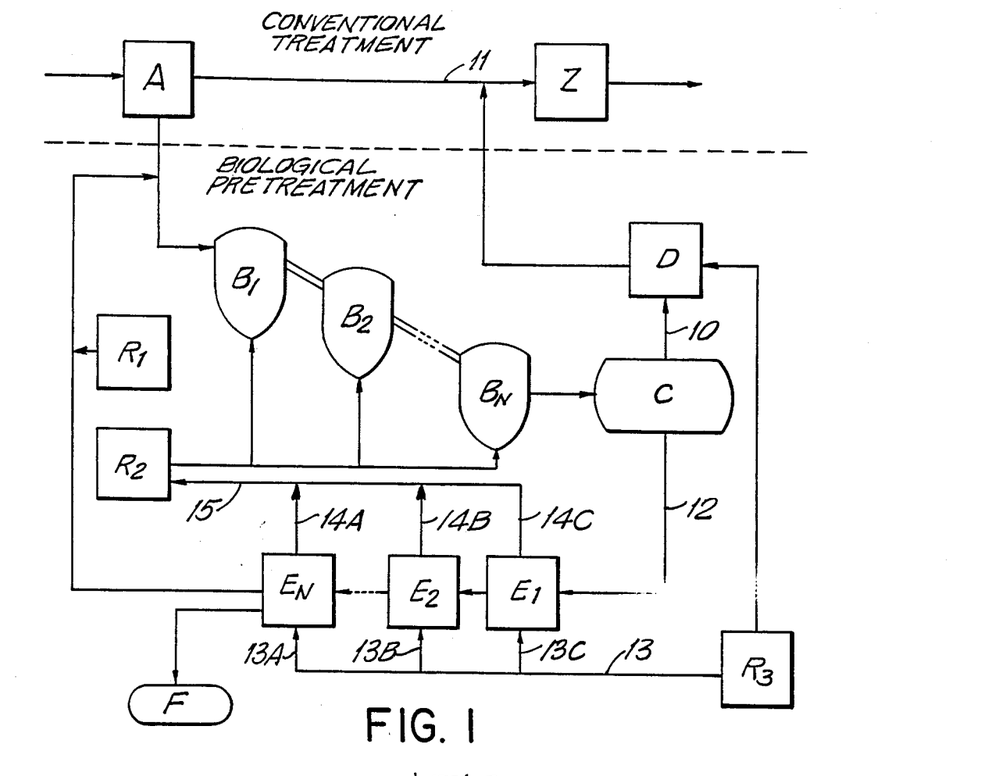
FIG. 1 depicts one embodiment of the invention in the form of an apparatus flow sheet for conducting continuous bioleaching.

In carrying a preferred embodiment of the invention into practice, the sulfidic material is contacted with an acidic solution containing as nutrients nitrogen salts, phosphorus salts and thermophilic microorganisms (facultative or obligate) in the presence of oxygen and carbon dioxide (Note FIG. 1). The thermophilic bacteria are capable of autotrophic growth on mineral sulfides and promote the decomposition of the occluding mineral sulfides within 12 to 72 hours, thereby releasing the precious metals for subsequent recovery (note FIG. 2). By autotrophic growth is meant that the bacterium obtains its carbon from $CO_2$ as a sole source.

Figure 3:
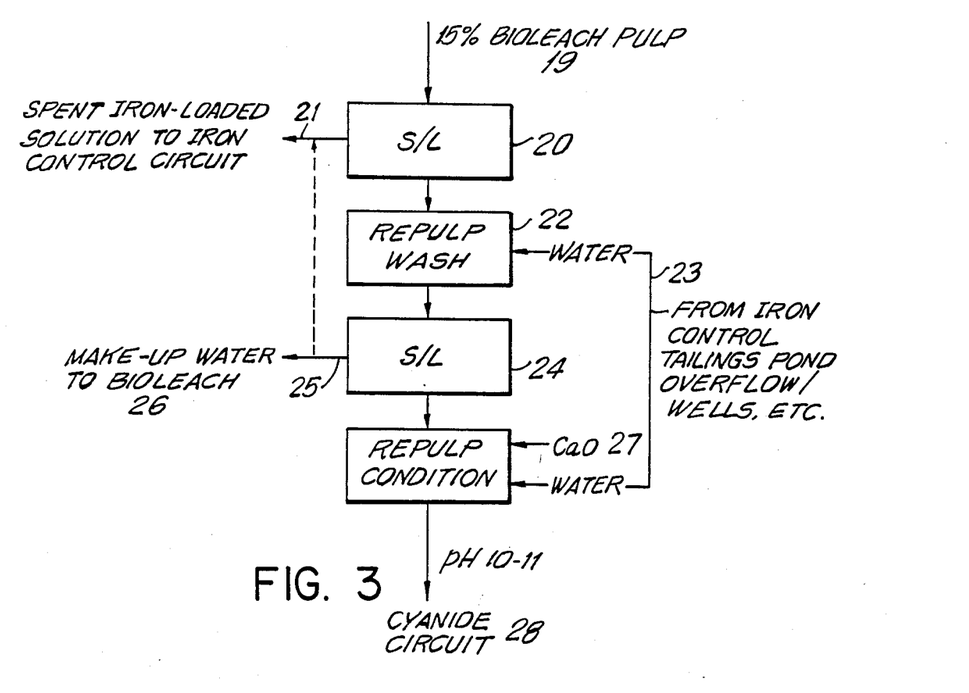
FIG. 3 is a simple flow sheet illustrating the bioleaching of a sulfidic material to produce a leached residue for treatment by cyanidation.

The leaching is carried out at an elevated temperature determined to be optimum for the particular thermophile or mixtures of thermophiles being used, and aeration is achieved using air or oxygen, with or without carbon dioxide enrichment. As shown in FIG. 3, upon completion of the leach cycle, the resulting pulp is subjected to solid/liquid separation and the bioleached residue is treated with specific leaching agents to recover precious metals.

Referring first to FIG. 1, the bioleaching process shown schematically is compared to conventional treatment normally employed on precious metal ore.

In the conventional treatment, precious metal ore as-received is ground and slurried in an aqueous medium at A and then extracted with cyanide at Z to recover precious metal therefrom. However, in the case of sulfidic material containing such precious metals as gold and silver, the conventional treatment is not sufficiently efficient to warrant its use. Thus, for the difficult-to-treat ores, the ore is ground, slurried, slightly acidified with acid, and nitrogen salts and phosphorus salts added from $R_1$ and the mix fed into a series of biological reactors $B_1$ to $B_N$ containing thermophilic bacteria as shown, where pre-oxidation of the sulfidic material takes place. Air and $CO_2$ are added to the reactor from $R_2$. The residence time through the series of biological reactors $B_1$ to $B_N$ is such that the material is pre-oxidized sufficiently for subsequent recovery of the released precious metals.

Thus, the pretreated slurry is discharged to filter C where the solids are separated from the solution and the solids 10 fed to D where they are neutralized with a base, e.g. limestone from $R_3$, and recycled back into the conventional treatment circuit 11 and the precious metals extracted with cyanide at Z. The acidic solution 12 is delivered to a series of neutralization tanks $E_1$ to $E_N$ where the solution is contacted with limestone and/or lime and air from $R_3$ by way of line 13 and feeder lines 13A, 13B and 13C. The reaction of limestone with acidic effluent produces $CO_2$. The evolved $CO_2$ along with air is fed via lines 14A, 14B and 14C from the neutralization tanks to $R_2$ through accumulator line 15 and from $R_2$ to biological reactors $B_1$ to $B_N$. The solution remaining after limestone treatment is recycled and make-up nutrient salts added as previously described. The solids formed during neutralization in tanks $E_1$ to $E_N$ are disposed at F as shown.

Figure 2:
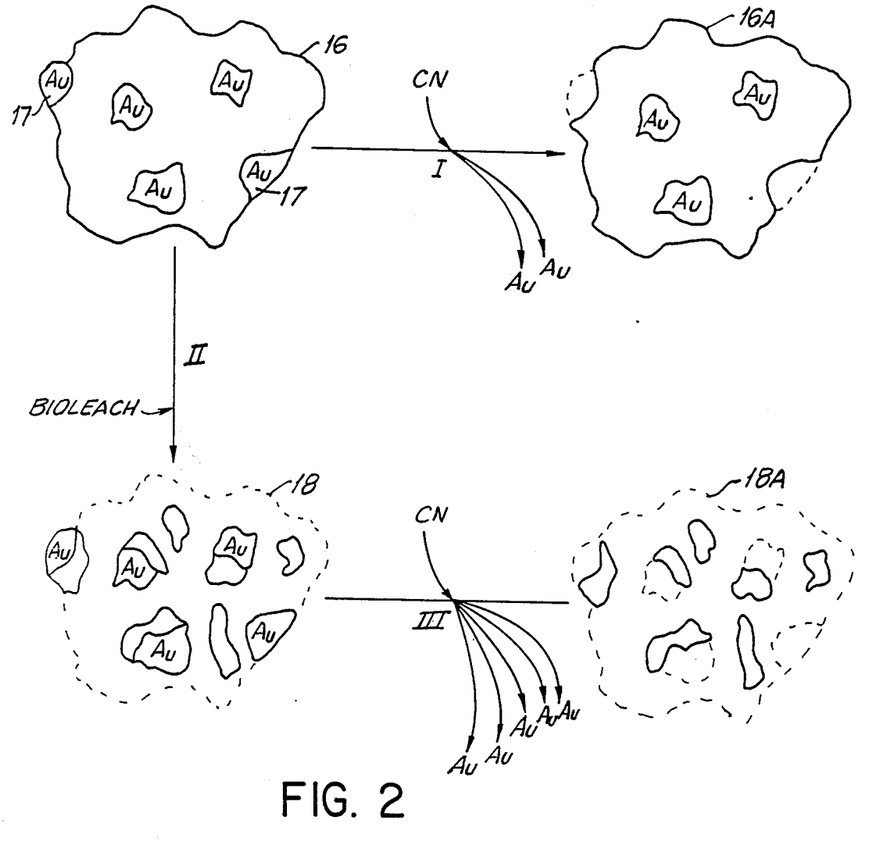
FIG. 2 depicts graphically the method by which precious methods are recovered by cyanidation.

The steps illustrated in FIG. 2 depict the differences between the conventional treatment and the biological pretreatment of the invention. In the conventional treatment, the original sulfidic particle 16 is shown with gold (Au) encapsulated within the mineral sulfide matrix. In the conventional treatment I, the cyanide leaching agent designated as CN is able to solubilize only that gold 17 which is exposed to the cyanide as shown, the particle 16A remaining still containing encapsulated gold.

On the other hand, when particle 18 is biologically treated to destroy much of the mineral sulfide matrix shown in step II, the cyanide leaching at III designated as CN results in a substantial improvement in the recovery of gold.

A simple flow sheet for preparing the bioleach pulp for cyanidation is illustrated in FIG. 3. Bioleach pulp 19 at 15% pulp density is fed to solid/liquid separation 20 where spent iron-loaded solution 21 is sent to iron control circuit and the solids passed to repulp wash station 22 to which wash water 23 is added as shown, the water being obtained from iron control tailings pond overflow, wells, etc. Following washing the solids are passed to solid/liquid separation 24 and the water effluent 25 used either as make-up water for bioleach or sent to iron control circuit as shown. Water from tailings pond or the like is used to repulp the solids to which lime 27 is added to raise the pH to 10 to 11 before passing the pulp to the cyanide circuit 28.

Figure 4:
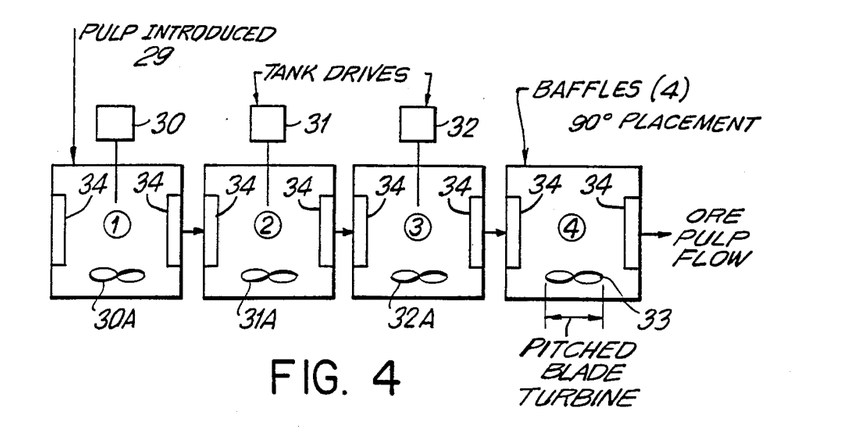
FIG. 4 is a schematic of a series-connected group of stirred reactors for carrying out the bioleaching of the sulfidic material.

A schematic of the biological pretreatment tanks is depicted in FIG. 4 comprising cylindrical tanks 1 to 4 series connected. A pulp 29 of the mineral sulfide containing the thermophilic bacteria and nutrients therefor is fed to tank No. 1 and on through tank No. 4. Tank drives 30, 31 and 32 are provided, the tanks showing schematically pitched blades 30A, 31A, 32A and 33 (tank drive not shown) which are coupled to the tank drives (coupling not shown). Internally, the tanks are provided with baffles 34, four being employed in each cylindrical tank spaced at 90° intervals.

In one embodiment, the tanks may have a volume of 28,260 liters each, the driving engines having a 30 HP capacity. The 4-tank system would have a total volume of $1.13 \times 10^5$ liters, the tanks being connected to permit continuous flow-through operation. Solids transfer from tank to tank is aided by placement of the tanks in descending elevation, one from the other, tank No. 4 having the lowest elevation.

Figure 5:
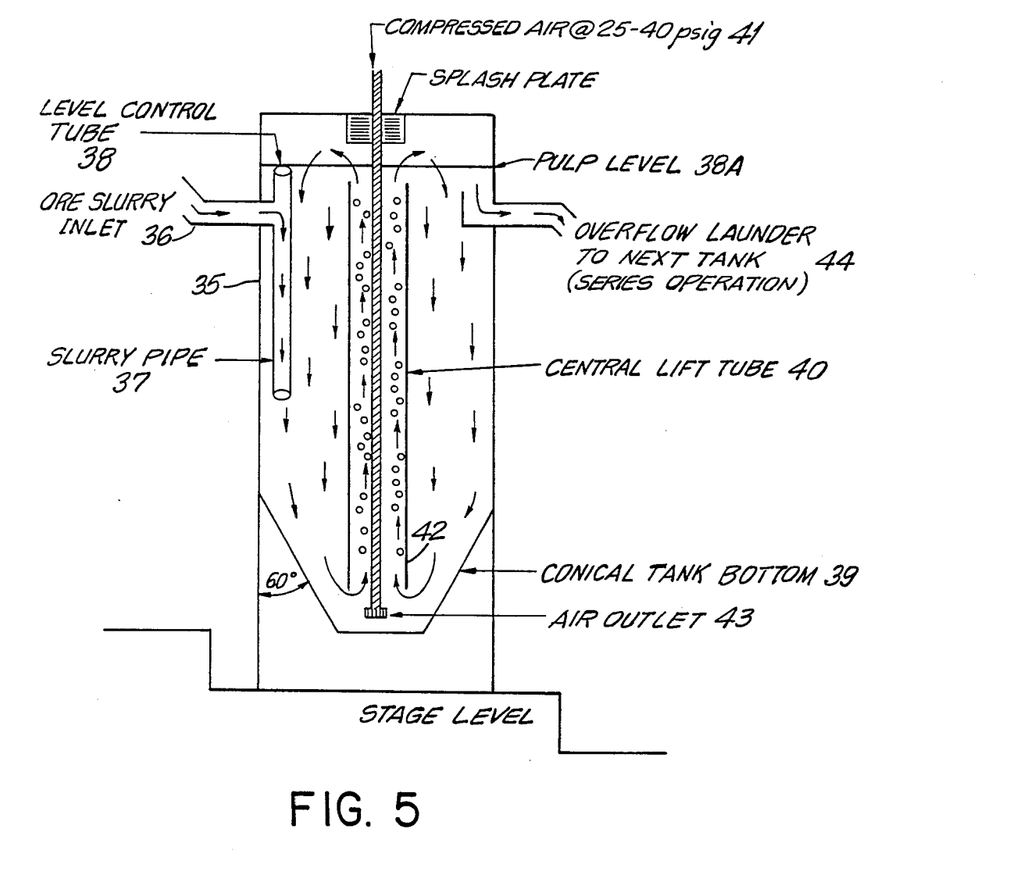
FIG. 5 is illustrative of one type of bioleach reactor referred to as the Pachuca tank air lift agitator.

One type of tank which may be employed is that referred to as a Pachuca tank air lift agitator. FIG. 5 is a schematic of a full center column Komata reef-type agitator. The tank 35 has an ore slurry inlet 36 which communicates with a vertically disposed slurry pipe 37. The open upper portion 38 of pipe 37 provides level control in the tank to maintain pulp level 38A. The tank has a conical bottom 39. A lift tube 40 is disposed centrally in the tank. An air tube 41 passes axially through the lift tube, the air tube extending to just below the bottom end 42 of the lift tube and terminating into an air outlet 43. Compressed air passing through the air tube provides for up and down circulation of the biological leach fluid and ultimately out through overflow launder 44 to the next tank.

The Pachuca tanks are situated in descending elevation to provide gravity-assisted transfer of solids between stages. A minimum of four stages is required to minimize "short circuiting" of the pulp.

By using the flow sheet arrangement shown in FIG. 1, the residence time for leaching can be controlled according to the number of bioleaching tanks employed to assure substantially complete release of the precious metals from the sulfidic material for the subsequent recovery thereof using specific leaching agents.

In the case of an acid leach, the residue obtained would be washed and then neutralized to a pH compatible with the use of a cyanide leaching agent, such as potassium cyanide, the pH as shown in FIG. 3 ranging from about 10 to 11.

An alternative procedure would be to add a leaching agent specific to precious metals, e.g., gold and silver, to the bioleaching process. For example, thiourea could be used under acidic conditions. Thus, the bioleached residue need not be neutralized when treated with thiourea for recovering the precious metals. An advantage of the bioleaching process is that it can be adapted to remove deleterious metals from the sulfidic material and thus render the bioleach residue more acceptable for the recovery of precious metals. An example of a deleterious metal is arsenic. As will be shown hereinafter, arsenic can be solubilized during bioleaching and thus separated from the residue in the solid/liquid separation step. This provides a residue which consumes less chemicals in the subsequent processing steps, or which is more environmentally acceptable for smelting.

As disclosed hereinbefore, leaching can be accomplished using various reactor or process modalities. Generally speaking, an acidic waste liquor is generated which can be treated for disposal or recycling by conventional techniques. One method involves partial neutralization with limestone ($CaCO_3$) which precipitates at least several of the dissolved metals and in addition generates carbon dioxide as discussed in the description of FIG. 1. One use of the acidic waste liquor is to use it as a preleach for acid-consuming ores, concentrates and tailings and thus render them suitable for acid bioleaching.

Numerous tests have shown that precious metal recovery is enhanced following pretreatment of ores and concentrates with thermophilic microorganisms both in batch tests and on a pilot plant scale.

As illustrative of the various embodiments of the invention, the following examples are given:

EXAMPLE 1

An arsenopyrite/pyrite gold ore in the form of a concentrate designated as S15 was treated in accordance with the invention. The concentrate contained the following minerals:

| Mineral | Wt. % |
| --- | --- |
| Pyrite ($FeS_2$) | 50 |
| Pyrrhotite ($Fe_{1-x}S$) | 2 |
| Arsenopyrite (FeAsS) | 15 |
| Orpiment ($As_2S_3$) | 2 |
| Realgar (AsS) | 1 |
| Dolomite [$CaMg(CO_3)_2$] | 4 |
| Quartz ($SiO_2$) | 8 |
| Aluminosilicates [$(FeMg)(Al_2O_3)(SiO_2)$] | 8 |
| Tennantite [$(Cu,Zn,Fe)_{12}\ As_4S_3$] | 2 |

The balance contains other minerals such as gratonite, galena, etc. Samples of the ore were mixed with a sulfuric acid solution at a pulp density of 5% (w/w) to provide a pH ranging from about 1.6 to 1.8. Nutrients included in the acid solution were as follows: 400 mg/l ammonium sulfate [$(NH_4)_2SO_4$]; 40 mg/l potassium phosphate dibasic ($K_2HPO_4$); 400 mg/l magnesium sulfate heptahydrate ($MgSO_4.7H_2O$); and 200 mg/l of yeast extract (Diffco).

The acid pH may vary. A test may start at a given acid pH and may either rise, fall or rise and then fall. In most tests, the variation may be quite wide, e.g., 0.7–1.6, 1–2, 1.2–2.9, etc.

The solution was inoculated with a thiobacillus-like facultative thermophile designated as S16I at a relatively high temperature of 50° C. This thermophile was obtained by culturing a sample of a gold ore designated as S16 ore obtained from the McLaughlin gold mine located in northern California approximately 70 miles northwest of San Francisco. The mine is owned by the Homestake Mining Company. The S16I thiobacillus-like thermophile was cultured by incubating a sample of the ore in a mineral salts solution containing the same salts at the same concentrations listed above.

The incubation was carried out for about 5 to 10 days and the thermophile detected microscopically and by indirect reaction in solubilizing iron.

The S16I facultative thermophile was maintained as a stock culture by transferring it to fresh mineral salts media with pyrite as a substrate on a monthly basis.

The inoculated acid solution and the contained mineral sulfide were mixed in Fernbach flasks by shaking at 50° C. and samples were taken out periodically and analyzed for iron extraction, arsenic extraction and subsequently gold extraction by cyanidation. The amount of gold in the starting concentrate was about 0.75 troy ounces/ton and silver about 0.235 troy ounces/ton. Only the gold and the iron and arsenic extractions were measured.

For comparison of gold extraction, the mineral sulfide without bioleaching was subjected to cyanidation. The particle size (U.S. standard) of the mineral sulfide in wt % was as follows: 7.3%+200 mesh, 24.7%−200+270 mesh, 13.3%−200+325 mesh, 30%−325+400 mesh and 24.7%−400 mesh.

The weight of each mixture for bioleaching was 1500 grams at 5% pulp density (by weight) at the aforementioned pH of 1.6 to 1.8.

The results obtained at various time intervals are given in Table 1.

TABLE 1

| Treatment Time (Days) | % Iron Extracted | % Arsenic Extracted | % Gold Recovered After Cyanidation |
| --- | --- | --- | --- |
| 0* | 0.0 | 0.0 | 0.0 |
| 2 | 14.5 | — | 19.7 |
| 6 | 23.5 | 35.4 | 31.7 |
| 10 | 35.5 | 60.0 | 47.7 |
| 13 | 45.3 | 80.7 | 62.2 |
| 17 | 59.8 | 98.4 | 74.2 |

*This sample represents the ore concentrate in the untreated state and which following cyanidation showed no gold recovery.

The samples bioleached at 2, 6, 10, 13 and 17 days, respectively, showed successive increases in percent extraction, such that at 17 days, about 60% Fe and 98% arsenic were extracted. Following bioleaching, about 74.2% gold was recovered from the residue resulting from the 17 day leach.

The cyanide solution employed for cyanidation comprised a solution of NaCN at a concentration of 10 grams/liter.

The results of the foregoing tests show that gold encapsulated in pyrite ($FeS_2$) and arsenopyrite (FeAsS) can be released from the sulfide lattice by at least partial oxidation of the sulfur, the iron and the arsenic to render it accessible to the cyanide leach solution. The practicality of using facultative thermophiles to solubilize arsenic provides a means of extracting deleterious mineral species, such as arsenic, from the ore or concentrate. The iron and arsenic can be removed from the solution by adding limestone to raise the pH to above 5 to precipitate the iron and arsenic as iron arsenate.

EXAMPLE 2

A pilot plant scale test was conducted to demonstrate the feasibility of using facultative thermophiles to enhance precious metal recovery in a continuous operation. In one test run, a pyrite-refractory gold ore was treated in a continuous flow-through unit made up of four 8 liter reactors series connected together. The test was carried out for a period of three weeks using a facultative thiobacillus-like thermophile at 50° C. designated as S1I. At start-up, the four reactors were operated separately as a batch reaction with no connection between the reactors until good bacterial growth was achieved. At that point, the reactors were connected and fresh pulp without bacteria added continuously to initiate continuous operation.

This thermophile was obtained by culturing a gold ore sample designated as S1I obtained from Midco Corporation in Midvale, Utah. The ore which contained the thiobacillus-like thermophile was cultured by incubating it in mineral salts solution containing 400 mg/l $(NH_4)_2SO_4$, 400 mg/l $MgSO_4.7H_2O$ and 40 mg/l $K_2HPO_4$, a yeast extract also being added. The incubation was carried out for about 5 to 10 days and the thermophile detected microscopically and by indirect reaction in solubilizing iron. The thiobacillus-like thermophile was designated as S1I.

As stated above, a mineral sulfide designated as S10 was incubated at 5% pulp density (w/w) in the four reactors (note FIG. 1) containing acidic nutrient solution and the facultative thermophile S1I over a period of 10 days at 50° C. at a pH of about 1.5 to 2.0. The nutrients in the acid bath comprised 500 mg/l of (NH$_4$)$_2$SO$_4$, 500 mg/l MgSO$_4$.7H$_2$O, 50 mg/l K$_2$HPO$_4$ and 200 mg/l yeast extract.

The analysis of the ore was as follows:

| Mineral | Wt. % |
|---|---|
| Pyrite (FeS$_2$) | 13 |
| Pyrrhotite (Fe$_{1-x}$S) | 1 |
| Rutile (TiO$_2$) | 1 |
| Orthoclase [K(AlSi$_3$O$_8$)] | 45 |
| Quartz (SiO$_2$) | 12 |
| Albite [Na(AlSi$_3$O$_8$)] | 4 |
| Amphibole [Ca$_2$(Mg,Fe)$_5$Si$_8$O$_2$(OH)$_2$] | 12 |
| Pyroxene [(Ca,Mg,Fe)Si$_2$O$_6$] | 2 |
| Chlorite [Mg$_3$(Si$_4$O$_{10}$)(OH)$_2$] | 2 |

The ore is referred to as a porphyry-copper type deposit dispersed in granite. The screen analysis (U.S. Standard) showed the following particle size distribution by weight: 37.9%+200 mesh, 7.7%−200+270 mesh, 4.3%−270+325 mesh, 2.3%−325+400 mesh and 47.9%−400 mesh.

The head assay for gold, silver and iron showed a gold content of about 0.054 opt (troy ounces/ton), a silver content of 0.896 opt and an iron content of 9.5% by weight.

To start the test, fresh pulp solution not containing bacteria or yeast extract was fed through the series connected biological leach tanks while air and CO$_2$ were fed into the reactors. Following three weeks of leaching at 50° C. it was noted that the ore treated had an average weight loss of 26%. The average iron extraction was 74%; the average gold recovery was 73% and the average silver recovery was 79% following neutralization and cyanidation of the bioleached residue. The data are summarized in Table 2.

| Time (days) | Bioleached Residue | | | % Au Re-covered | % Ag Re-covered |
|---|---|---|---|---|---|
| | Opt Au*** | Opt Ag*** | % Fe | % Wt. Loss | | |

| Time (days) | Opt Au*** | Opt Ag*** | % Fe | % Wt. Loss | % Au Re-covered | % Ag Re-covered |
|---|---|---|---|---|---|---|
| 0* | — | — | — | — | 14 | 44 |
| 1 | 0.091 | 0.456 | 3.4 | 41 | 82 | 69 |
| 4 | 0.072 | 1.168 | 2.7 | 25 | 74 | 83 |
| 7 | 0.070 | 1.121 | 3.0 | 23 | 73 | 76 |
| 8** | 0.068 | 1.215 | 3.1 | 21 | 49 | 76 |
| 11 | 0.089 | 1.483 | 7.7 | 40 | 71 | 67 |
| 12 | 0.072 | 1.285 | 5.1 | 25 | 78 | 71 |
| 15 | 0.077 | 1.028 | 2.6 | 30 | 74 | 91 |
| 18 | 0.072 | 1.075 | 2.3 | 25 | 75 | 88 |
| 21 | 0.084 | 1.100 | 2.4 | 36 | 81 | 91 |

*The ore was subjected to direct cyanidation without bioleaching.
**CO$_2$ flow terminated on day 8 and was resumed on day 11.
***troy ounces/ton The data show that silver recovery as well as gold recovery can be enhanced using a thermophilic organism during pretreatment. Thermophilic bioleaching results in decreased ore weight due to solubilization of the inorganic components. This enriches the residue in precious metals and also reduces the capacity requirements (and hence the capital costs) of the conventional cyanidation plant downstream.

The data indicate the importance of supplying CO$_2$ to the microorganisms. When the flow of CO$_2$ was stopped on day 8, gold recovery dropped significantly. When the flow was resumed on day 11, the recovery of gold increased substantially. This illustrates the importance of supplying CO$_2$ to autotrophic microorganisms when CO$_2$ is the sole source of carbon.

As pointed out in the description of the flow sheet of FIG. 1, the recycling of CO$_2$ formed by neutralizing the leach solution with limestone has important economic considerations since it reduces the necessity of using outside sources of CO$_2$ which can be cost intensive.

Thus, a preferred embodiment of the invention resides in a method of recovering precious metals from refractory mineral sulfides in which at least one precious metal is occluded in a form that inhibits the recovery thereof by conventional leaching processes. The method comprises providing the mineral sulfide in the finely ground state, forming a slurry of the sulfide with acid, nutrient nitrogen salts and phosphorus salts to which a thermophilic microorganism (facultative or obligate) has been added, feeding the slurry into a series of bioleaching reactors ranging from a first reactor to an Nth reactor, the rate of feed through the reactors being at least sufficient to provide a residence time in the series of reactors at least sufficient to effect partial to complete oxidation of the mineral sulfide, the oxidation being sufficient to release substantially all of the precious metals. During leaching, air and carbon dioxide are added to the reactors, while allowing for oxidation of the sulfide by said thermophile.

The additional steps include passing the slurry in the reacted form from said Nth reactor to a solid/liquid separator to provide a residue containing liberated precious metals and a filtered acid leach liquor which is cycled to a series of neutralization tanks, neutralizing the residue to remove acid radicals therefrom, subjecting said neutralized residue to cyanidation with a cyanide solution to dissolve selectively precious metals therein that form soluble complexes with said cyanide solution, neutralizing the acid leach liquor using limestone whereby CO$_2$ is formed and recycled to the bioleaching reactors, adding make-up acid and nutrients to the acid leach liquor, recycling the leach liquor with said nutrients to the bioleaching reactors, and then recovering the precious metals from the cyanide solution.

The preferred embodiment described hereinabove corresponds to the embodiment shown in FIG. 1. The following additional examples are given:

EXAMPLE 3

A finely ground pyritic gold ore similar to that of Example 2 was leached in a small, continuous-stirred tank reactor using the extreme thermophile Sulfolobus BC at 60° C. This microorganism was isolated from the Birch Coppice Colliery in Warwickshire, United Kingdom. It oxidizes iron and sulfur species and grows autotrophically at temperatures in the range of about 50° C. to about 90° C.

The microorganism was grown in a nutrient solution comprising 400 mg/l (NH$_4$)$_2$SO$_4$, 400 mg/l MgSO$_4$.7H$_2$O, 40 mg/l K$_2$HPO$_4$, and 200 mg/l yeast extract with 3% by weight pyrite ore at 60° C. in an incubating shaker flask. The pH of the media was 1.5 to 1.8.

The bioleaching was carried out at a pulp density of 5% by weight using a sulfuric acid solution at a pH of about 1.0 to 1.8. The nutrients comprised 400 mg/l of (NH$_4$)$_2$SO$_4$, 400 mg/l of MgSO$_4$.7H$_2$O and 40 mg/l of K$_2$HPO$_4$. During leaching, a mixture of air and CO$_2$ was fed into the leach solution.

The pyritic gold ore in the unleached condition showed a gold recovery following cyanidation of about 43%. Following bioleaching, 86% of the iron was extracted. When the residue was treated by cyanidation using a solution containing 10 grams/liter of NaCN, the gold recovery had increased to 86%. The extreme thermophiles of the Sulfolobus type are advantageous in that relatively high temperatures can be used, e.g., 60° C. to 90° C. It is not necessary to cool the bioleaching bath as much during leaching as is required when other microorganisms are used, such as *Thiobacillus ferrooxidans* which are temperature sensitive at temperatures exceeding 45° C. and thus become less viable. Oxidation of sulfide ores is an exothermic reaction. In order to maintain the viability of *T. ferrooxidans*, the temperature of the oxidation reaction must be controlled by cooling which can be costly.

In addition to refractory sulfide materials, e.g., ores, concentrates, tailings, etc., there are also refractory carbonaceous sulfide ores which are difficult to treat because of the presence of carbon as well as sulfur. Carbonaceous refractory gold ores contain gold encapsulated within the iron sulfide mineral. This material is difficult to treat following bioleaching because the gold-cyanide complex obtained during cyanidation is readily adsorbed by the organic matter in the ore and thus is not available for recovery.

The adverse effects of carbonaceous material in the cyanidation of gold ores is discussed in Chapter 2, pages 17–22, of the publication Gold and Silver Leaching, Recovery and Economics; Proceedings from the 110th AIME meeting in Chicago, Ill.; Feb. 22–26, 1981 (Editors: W. J. Schlitt et al). The article appearing in Chapter 2 is entitled "The Treatment of Refractory Gold Ores Containing Carbonaceous Material and Sulfides." According to the article, the term "carbonaceous" has been loosely applied to ore constituents of widely varying constituents. Carbonaceous ores have been shown to contain (1) an activated carbon component capable of adsorbing gold complexes in solution, (2) a mixture of high molecular weight hydrocarbons usually associated with the activated carbon components, and (3) an organic acid similar to "humic acid" containing functional groups capable of interacting with gold complexes (e.g., gold cyanide complexes) to form organic gold compounds.

The deposits in the Carlin Mine district in Nevada are so deleterious to cyanidation that a mixture containing 5% carbonaceous ore and 95% standard cyanidable ore gives a cyanidation extraction of 76.9% gold as compared to 93% for 100% standard ore. The deleterious effect of carbon on cyanidation of gold ore is referred to as "Preg-Robbing".

A method known in the art for overcoming the "Preg-Robbing" effect of carbonaceous materials is to use blanking agents to passivate the surfaces of the active carbon. A blanking agent which has been used is one designated RV-2 which is a para nitro benzol azo salicilic acid (sic). Another blanking agent is kerosene. Examples of other blanking agents are detergents and Acintol-FA1 (a tall oil fatty acid).

Another method of counteracting the effects of "Preg-Robbing" is to disperse particles of activated carbon in the cyanide solution so that during cyanidation the gold complex is adsorbed onto the dispersed carbon particles which can be separated from the residue by filtration and washing. The use of particles of activated carbon is referred to as carbon-in-leach and designated as CIL.

EXAMPLE 4

An ore (designated C5) having high "Preg-Robbing" characteristics was treated using in one instance a bacterium referred to hereinbefore as S16I and in another instance with a leach solution generated through the growth of Sulfolobus BC on Pyrite ore. The ore was made up of the following minerals:

| Mineral   | Wt. % |
|-----------|-------|
| Pyrite    | 2     |
| Brookite  | 0.5   |
| Dolomite  | 10    |
| Muscovite | 20    |
| Quartz    | 65    |

The head analysis for gold was 0.166 opt (troy ounces per ton), the silver was 0.023 opt and the iron content by weight was 3%. The ore had a "Preg-Robbing" potential of 70.1±3.7%, which corresponds to the percentage of gold adsorbed from a pregnant solution containing 2 mg/l Au as gold cyanide.

The following tests were conducted:
(1) Direct cyanidation of native ore.
(2) Direct cyanidation of acidified native ore.
(3) Cyanidation of native ore after AFA (Acintol FA1) treatment.
(4) Cyanidation of native ore after Sulfolobus BC leach extract treatment at 50° C.
(5) CIL (carbon-in-leach) cyanidation of native ore.
(6) Direct cyanidation of bioleached ore using the S16I thermophile, the bioleaching having been conducted at 50° C.
(7) Cyanidation of bioleached ore as in (6) above except after AFA treatment.
(8) CIL cyanidation of bioleached ore as in (6) above except for carbon-in-leach treatment (CIL).

The ore that was treated had the following sieve analysis: 23.7%+200 mesh, 7.7%−200+270 mesh, 5.1%−270+325 mesh, 3.5%−325+400 mesh and 60%−400 mesh.

In the case where the pyrite ore was bioleached using Sulfolobus BC as the bacterium, the pulp density in the sulfuric acid solution was about 5% by weight, the pH ranging from about 0.7 to 1.6 at a temperature of 70° C. The leach solution, not containing bacteria, was used in treatment (4) given in Table 3 below.

When the ore was bioleached using the thermophile designated as S16I, the pulp density was 10% with the pH ranging from about 1.5 to 1.8. The leached residue obtained was used in treatments (6), (7) and (8) given in Table 3 below.

TABLE 3

| Treatment | % Iron Extraction | % Gold Recovery |
|---|---|---|
| (1) Direct Cyanidation of Native Ore | — | 30.6 |
| (2) Direct Cyanidation of Acidified Native Ore | 11.7 | 34.4 |
| (3) Cyanidation of Native Ore After AFA Treatment (Blanking Agent) | 16.8 | 48.4 |
| (4) Cyanidation of Native Ore After Treatment With Sulfolobus BC Leach Solution | 49.1 | 52.2 |
| (5) CIL Cyanidation of Native Ore (Dispersion of Activated Carbon) | — | 42.7 |
| (6) Direct Cyanidation of Ore After Bioleaching with S16I Thermophile | 39.1 | 56.1 |
| (7) Cyanidation of Bioleached Ore of (6) Above After AFA Treatment | 39.1 | 68.2 |
| (8) CIL Cyanidation of | 39.1 | 73.4 |

TABLE 3-continued

| Treatment | % Iron Extraction | % Gold Recovery |
|---|---|---|
| Bioleached Ore of (6) (Dispersion of Activated Carbon) | | |

As will be noted from treatments (1), (2) and (3), the gold recovery from the carbonaceous ore in the unleached condition is improved by using the blanking agent AFA. Compared to treatment (2) in which the gold recovery was 34.4%, treatment (3) gave a recovery of 48.4% or an improvement of approximately 40%. However, it will be noted that a higher gold recovery of 52.2% was obtained when the ore was treated with leach solution obtained from Sulfolobus BC bioleaching of pyrite. The acid ferric sulfate in the leach solution promotes some leaching even without the presence of the bacteria.

In the case of treatment (5) in which particles of activated carbon were used to adsorb the gold complex during cyanidation of the native ore, the results were not as good as the results obtained with the blanking agent AFA.

With regard to treatments (6), (7) and (8) in which the gold ore was first bioleached using the thermophile S16I, treatment (6) gave a gold recovery of 56.1% which was markedly improved to a yield of 68.2% when the blanking agent AFA was used to passivate the carbonaceous surface of the ore particles. The gold recovery was even further improved to 73.4% when a dispersion of activated carbon was used to inhibit "Preg-Robbing" by the carbonaceous material in the ore.

The results of the foregoing tests illustrate the importance of using blanking agents or activated carbon to overcome the "Preg-Robbing" effects of the carbonaceous material in the ore.

As previously stated, Sulfolobus sp. is a preferred thermophile because of the relatively high temperatures over which it can operate, e.g. about 50° C. to about 90° C. With regard to S. acidocaldarius, sulfur was oxidized quantitatively to sulfate by the microbe when cultured at pH 3.2 and 70° C. The cells have been reported to attach to sulfur particles during growth. Further details regarding the Sulfolobus microbes are given in Chapter 12 (p. 279–305) in the book entitled "Thermophiles: General, Molecular and Applied Microbiology" (Published June 1986 by John Wiley & Sons, Inc.).

Tests were conducted comparing various acidophilic thermophiles designated as TH-1, TH-2, TH-3, TH-4, S1I and S16I, these facultative thermophiles being identified by source as follows:

TABLE 4

| Designation | Source Description |
|---|---|
| TH-1 | Thermal spring, Iceland |
| TH-2 | Copper-leaching test system, Socorro, New Mexico |
| TH-3 | Copper-leaching dump, Chino Mine, Kennecott Copper Corp. Hurley, New Mexico |
| TH-4 | Copper-leaching dump, Bingham Mine, Kennecott Copper Corp., Bingham, Utah |
| S1I | Cultured from a gold sample obtained from Midco Corporation in Midvale, Utah. |
| S16I | Thermophile culture from a gold ore designated as S16 obtained from the McLaughlin gold mine located in northern California about 70 miles northwest of San Francisco. |

In comparing each of the facultative thermophiles in enhancing gold recovery, pulps of the S10 ore referred to in Example 2 were employed. The particle size of the ore by weight comprised 9.4%+200 mesh, 8.3%−200+270 mesh, 12.4%−270+325 mesh, 10.0%−325+400 mesh and 59.9%−400 mesh, the composition of the ore being the same as that set forth in Example 2, including the gold and silver assay.

Pulps of the ore were prepared at 5% pulp density by weight in nutrient salts media as described in Example 1. The pH was adjusted to 1.6 at 50° C. using sulfuric acid. The non-sterile pulps, as previously described, were then inoculated with starter cultures of either TH-1, TH-2, TH-3, TH-4, S1I or S16I and the ore allowed to incubate. Each representative pulp in an amount of one kilogram was incubated in a Fernbach flask. Each flask was subjected to shaking for five days, during which iron solubilization was monitored. Upon completion of the five days, each of the pulps was filtered and analyzed.

The final iron extraction was determined and the filtered residue was washed and neutralized with lime to a pH of about 10 to 11 following which the washed residue from each test was subjected to cyanidation using a NaCN cyanide solution containing 10 grams/liter of NaCN, the solution being at a temperature of about 25° C.

The results obtained for both bioleaching and the subsequent cyanidation of the residue are given in Table 5 below:

TABLE 5

| Facultative Thermophile | % Iron Extracted | % Gold Extracted | % Silver Extracted |
|---|---|---|---|
| TH-1 | 92.1 | 90.2 | 85.9 |
| TH-2 | 93.7 | 94.1 | 83.6 |
| TH-3 | 90.6 | 94.1 | 75.3 |
| TH-4 | 94.7 | 90.2 | 84.6 |
| S1I | 89.4 | 90.2 | 77.4 |
| S16I | 94.5 | 90.2 | 87.6 |
| No treatment | — | 37.3 | 34.5 |

As will be noted, all of the thermophiles showed substantially high iron extraction. This appears to indicate that substantially all of the sulfide ore was oxidized to release the precious metals in the residues afterwhich metals were recovered at substantially high efficiency by cyanidation.

Figure 6:
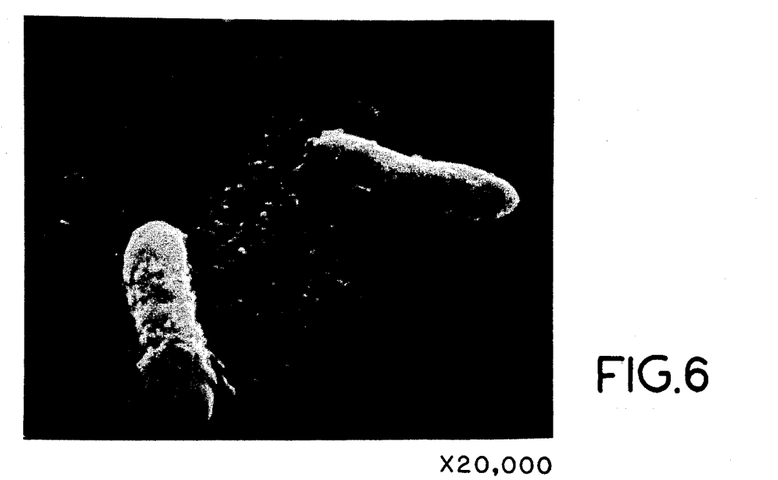
FIG. 6 is a photomicrograph taken at 20,000 times magnification of a facultative thermophile designated as TH-4.

FIG. 6 is a photomicrograph taken at 20,000 times magnification of rod shaped thiobacillus-like facultative thermophile designated as TH-4; the other facultative thermophiles (S1I, S16I, etc.) are similar in appearance and physiology.

Generally speaking, the cyanide solution is an alkali metal cyanide solution. Preferably the cyanide solution is selected from the group consisting of NaCN and KCN. The solution generally contains at least about 0.1 g/l, and preferably ranges from about 0.1 g/l to 10 g/l of said NaCN and/or KCN.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A method for recovering precious metals from particulate refractory mineral sulfides in which at least one precious metal is occluded within the sulfide particulate which impedes the recovery of precious metals therefrom by direct leaching which comprises: bioleaching a mineral sulfide containing said occluded precious metal with an aqueous solution containing at least one facultative or obligate thermophile capable of promoting the oxidation of said mineral sulfide, said bioleaching being carried out at a temperature of at least about 45° C. but not exceeding that temperature above which the thermophile is degraded, said bioleaching being carried out in the presence of nutrients specific to the growth of said thermophile for a time at least sufficient to oxidize said sulfide mineral and liberate said precious metal and provide a residue containing said liberated precious metal in recoverable form, separating said precious-metal-containing residue from said bioleach solution, washing said residue, and then leaching said precious-metal-containing residue with an aqueous leach solution selective to the dissolution of said liberated precious metal and provide a residue impoverished in said precious metal.

2. The method of claim 1, wherein said facultative or obligate thermophile is acidophilic and said bioleach solution is acidic.

3. The method of claim 2, wherein the temperature of the bioleach solution falls within the range of over about 45° C. to about 90° C., the upper temperature selected not exceeding that temperature above which the thermophile is degraded.

4. The method of claim 2, wherein said thermophile is a facultative thermophile.

5. The method of claim 2, wherein the thermophile is an obligate Sulfolobus species.

6. The method of claim 5, wherein the Sulfolobus species is selected from the group consisting of *Sulfolobus brierleyi, Sulfolobus acidocaldarius,* Sulfolobus BC and *Sulfolobus solfataricus.*

7. The method of claim 1, wherein the mineral sulfide is a refractory carbonaceous mineral sulfide capable of adsorbing precious metal cyanide complexes from solution, wherein following the oxidative bioleaching of said carbonaceous material, the oxidized mineral is then treated with a carbon-adsorbable blanking agent to inhibit the precious-metal-adsorbing propensity of said carbonaceous mineral, wherein said oxidized mineral as a residue is separated from the bioleach solution, and wherein said residue containing said liberated precious metal is leached to provide a pregnant liquor containing said precious metal and provide a leached residue impoverished in said precious metal.

8. The method of claim 1, wherein the washed residue is thereafter neutralized, and wherein said leach solution for said precious metal is an alkali metal cyanide solution.

9. The method of claim 6, wherein said leach solution for said precious metal is an alkali metal cyanide solution.

10. The method of claim 1, wherein the mineral sulfide is a refractory carbonaceous mineral sulfide capable of adsorbing precious metal cyanide complexes from solution, and wherein during the oxidation bioleaching of said carbonaceous mineral sulfide, a dispersion of activated carbon particles is added selective to the adsorption of said precious metal complexes, whereby adsorption of said precious metal complexes by said carbonaceous material is substantially inhibited.

11. A method for recovering precious metals from particulate refractory mineral sulfides in which at least one precious metal is occluded within the sulfide particulate which impedes the recovery of precious metals therefrom by direct leaching which comprises:

providing said mineral sulfide in the finely ground state, forming a slurry of said sulfide with acid, nutrient nitrogen salts and phosphorus salts to which an acidophilic thermophile has been added, the pH of said slurry ranging from about 0.5 to 3, feeding said slurry into a series of biological reactors ranging from a first reactor to an Nth reactor, the rate of feed through the reactors being at least sufficient to provide a residence time to effect partial to complete oxidation of the mineral sulfide sufficient to liberate the precious metals therein, adding air and carbon dioxide to said reactors during said residence period while allowing for oxidation of said sulfide by said thermophile at a temperature in excess of about 45° C. but not exceeding that temperature above which the thermophile is degraded, passing said slurry in the reacted form from said Nth reactor to a solid/liquid separator to provide a residue containing liberated precious metals and a filtered acid leach liquor which is cycled to a series of neutralization tanks, neutralizing acid in said residue, subjecting said neutralized residue to cyanidation with a cyanide solution to dissolve selectively precious metals therein that form soluble complexes with said cyanide solution, neutralizing said filtered acid leach liquor using limestone whereby $CO_2$ is formed and recycled to the biological reactors, adding make-up acid and nutrients to said acid leach liquor, recyling said leach liquor with said nutrients to said biological reactors, and recovering said precious metals from said cyanide solution.

12. The method of claim 11, wherein the temperature of the bioleach solution ranges from over about 45° C. to about 90° C., the upper temperature selected not exceeding that temperature at which said thermophile loses its viability.

13. The method of claim 12, wherein the thermophile is facultative thermophile.

14. The method of claim 12, wherein the thermophile is an obligate Sulfolobus species.

15. The method of claim 14, wherein the Sulfolobus species is selected from the group consisting of *Sulfolobus brieleyi, Sulfolobus acidocaldarius,* Sulfolobus BC and *Sulfolobus solfataricus.*

16. The method of claim 11, wherein the mineral sulfide is a refractory carbonaceous mineral sulfide capable of adsorbing precious metal cyanide complexes from solution,
- wherein following the oxidative bioleaching of said carbonaceous material, the oxidized mineral is then treated with a carbon-adsorbable blanking agent to inhibit the precious-metal-adsorbing propensity of said carbonaceous mineral,
- wherein said oxidized mineral as a residue is separated from the bioleach solution, and
- wherein said residue containing said liberated precious metal is leached to provide a pregnant liquor containing said precious metal and provide a leached residue impoverished in said precious metal.

17. The method of claim 11, wherein said leach solution for said precious metal is an alkali metal cyanide solution.

18. The method of claim 15, wherein said leach solution for said precious metal is an alkali metal cyanide solution.

19. The method of claim 11,
- wherein the mineral sulfide is a refractory carbonaceous mineral sulfide capable of adsorbing precious metal cyanide complexes, and
- wherein during the oxidative bioleaching of said carbonaceous mineral sulfide, a dispersion of activated carbon particles is added selective to the adsorption of said precious metal complexes,
- whereby adsorption of said precious metal complexes by said carbonaceous material is inhibited.

* * * * *